US007096564B2

(12) United States Patent
Sullivan

(10) Patent No.: US 7,096,564 B2
(45) Date of Patent: Aug. 29, 2006

(54) WIRE END INSERT TOOL WITH REPLACEABLE CUTTING BLADE

(76) Inventor: Robert W. Sullivan, 3310 Los Nogales Rd., Simi Valley, CA (US) 93063

( * ) Notice: Subject to any disclaimer, the term of this patent is extended or adjusted under 35 U.S.C. 154(b) by 113 days.

(21) Appl. No.: 10/836,508

(22) Filed: Apr. 29, 2004

(65) Prior Publication Data

US 2005/0086792 A1 Apr. 28, 2005

Related U.S. Application Data

(60) Provisional application No. 60/514,047, filed on Oct. 24, 2003.

(51) Int. Cl.
*B23P 23/00* (2006.01)
*H01R 43/00* (2006.01)

(52) U.S. Cl. ........................ 29/566.4; 29/566.3; 29/750

(58) Field of Classification Search ............... 29/566.4, 29/566.3, 750, 751, 758
See application file for complete search history.

(56) References Cited

U.S. PATENT DOCUMENTS 3,708,852 A * 1/1973 Mason ...................... 29/556.4
3,898,724 A * 8/1975 Conorich .................. 29/556.4
4,161,061 A 7/1979 Mason et al.
4,241,496 A 12/1980 Gregson
4,271,573 A * 6/1981 von Roesgen ............ 29/566.4
4,696,090 A 9/1987 Gregson et al.
5,175,921 A * 1/1993 Krietzman ................ 29/566.4
5,195,230 A 3/1993 Krietzman
5,758,403 A 6/1998 Fallandy
5,813,109 A 9/1998 Ziegler et al.
5,842,268 A * 12/1998 Arnfield .................... 29/566.4
5,887,333 A 3/1999 Clark
6,601,285 B1 8/2003 Jonker et al.
6,615,480 B1 9/2003 Murphy
6,625,867 B1 * 9/2003 Jonker ....................... 29/566.4

* cited by examiner

*Primary Examiner*—Boyer D. Ashley
*Assistant Examiner*—Dana Ross
(74) *Attorney, Agent, or Firm*—Gene W. Arant

(57) ABSTRACT

A tool assembly includes an elongated metal tool body for forcibly inserting the end of an insulated wire into a telephone connector of the insulation displacing type, and having a separate and replaceable cutting blade removably attached to the tool body for cutting off the then protruding end of the insulated wire after electrically conductive engagememnt of the wire with the blades of the connector has been achieved.

3 Claims, 3 Drawing Sheets

WIRE END INSERT TOOL WITH REPLACEABLE CUTTING BLADE

PRIORITY CLAIM

This application claims the priority of my U.S. Provisional Application Ser. No. 60/514,047 filed Oct. 24, 2003.

FIELD OF THE INVENTION

The field of this invention is tools for wiring telephone circuits or the like.

BACKGROUND OF THE INVENTION

In terminating telephone or high-speed data wires in a terminal block, an insulated end of each wire is forced into a insulation displacing type of connector that is mounted in and a part of a circuit board. A presently conventional tool system employs a hand piece to generate an impact force on a tool body, and the tool body in turn applies the same impact force to the end of the wire to force it into the connector. Forcing the wire into the connector also cuts the insulating cover of the wire, so that there is then an electrically conductive engagememnt of the wire with the connector blades. When the wire end is properly seated in the connector it is then also necessary to cut off a protruding end portion of the insulated wire.

PRIOR ART

In conjunction with an impact-generating hand piece a well known type of tool body has a U-shaped forward end for guiding a wire end in order to correctly and conductively position it in a connector. Such a tool body is shown, for example, in U.S. Pat. No. 4,161,061 to Mason et al issued Jul. 17, 1979. The tool body also has a cutting blade to cut off a protruding portion of the wire when the wire end has been conductively seated within the connector. The tool body is made as an integral member to perform both the positioning and the wire cutting operations.

Another example of this prior art is the 3X Eversharp 110 Blade designated as "Impact Tool Blade" product No. 10176-500 of Harris Corporation, 809 Calle Plano, Camarillo, Calif. 93012-8519, which performs both positioning and wire cutting operations. Such tool bodies have typically been cast and heat treated.

Experience has shown that tool bodies used in the impact type of tool system frequently have to be discarded because of wear and/or damage to the cutting edge of the blade. Experience has also shown that a dull or damaged cutting edge requires a high level of force which may then cause damage to the circuit board.

SUMMARY OF THE INVENTION

My Wire End Insert Tool With Replaceable Cutting Blade includes a cast tool body that is used to position the end of an insulated wire in an insulation displacing type of connector terminal, and a separate and replaceable cutting blade which is removably attached to the tool body for cutting off the protruding end of the insulated wire. The separate cutting blade is made of a good quality tool grade steel.

According to the presently preferred embodiment of my invention I also attach the cutting blade to the tool body at two different points along the length of the blade.

In one alternate form of my invention a stiffener member is used in conjunction with the blade, in order to make it possible to use a rather thin and very sharp blade.

According to another alternate form of my invention a longitudinally extending stiffening rib is formed on the upper surface of the blade, to add to its stiffness and hence precision in cutting action.

In still another alternate form of my invention the cutting blade has a tight tolerance mating edge to hold the blade in place against the tool body, and is fastened there with only a single screw.

In yet another alternate form of my invention the cutting end of the cutting blade is sharpened from both its lateral side edges, thus making for a cleaner cutting action.

An advantage of my invention is that the cutting blade may be replaced without having to replace the tool body with which the blade is used. A technician working in the field can carry smaller replacement blades in place of the larger and heavier tool bodies, and does not have to carry complete replacement tools. The smaller blades can be made readily available, which results in a considerable saving.

A further advantage is that in my invention the replaceable cutting blade is made from a material that is able to provide a sharper cutting edge, and therefore achieves a sharper and cleaner cut on the end of the insulated wire being terminated. This cutting action reduces the force required to cut the insulated wire, resulting in less damage to the circuit board to which the connector is being attached.

Still another advantage is that, in an optional form of my invention the cutting blade is made of a ceramic material, thus greatly reducing the likelihood of electrical shock to the technician using the tool.

DRAWING SUMMARY

DESCRIPTION OF THE PREFERRED EMBODIMENT

FIG. 1

Figure 1:
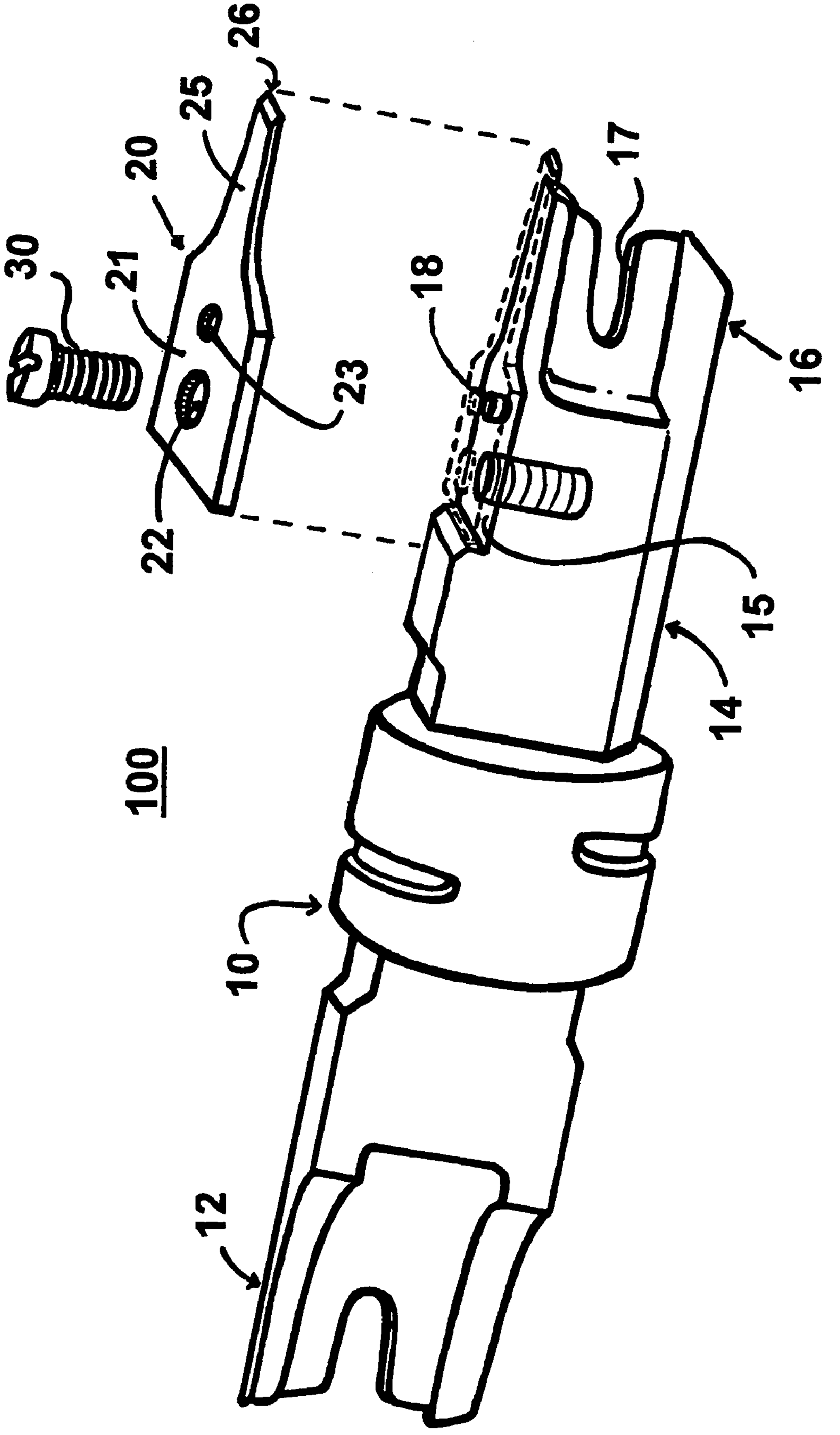
FIG. 1 is a perspective and exploded view of the presently preferred form of my invention.

Referring now to FIG. 1 of the drawings, the presently preferred embodiment of my termination tool will now be described. The tool assembly 100 includes an elongated metal tool body 10 made of cast metal which is not heat treated. The tool body 10 has a positioning end 12, and a positioning and cutting end 14. The separate positioning end 12 is provided in accordance with the known prior art practices. The cutting end 14 has a side surface 15, and also has a forward end portion 16 with a U-shaped opening 17 that can partially encircle the end of a wire while forcing the wire to conductively engage an insulation displacing connector. Cutting end also has a hole 24 to receive a screw 30, as will be described. It also has a riser or locator pin 18 for securing the cutting blade in place, as will be described.

My replaceable blade member 20 is made of tool grade steel. It is of essentially flat configuration and has a wide rearward end portion 21 and a much narrower forward end portion 25. A screw hole 22 in the rearward end portion 21 is provided for securement by a screw 30. The forward end portion 25 has a cutting edge 26 thereon that is aligned perpendicular to the U-shaped opening 17. As shown by the dotted lines in FIG. 1, the screw 30 is used to pass through the screw hole 22 in the blade member into the hole 24 to secure the blade member to side surface 15 of the tool body 10. As also shown in FIG. 1 the rearward end portion 21 of blade member 20 is much wider that its forward end portion 25.

A riser or locator pin 18 is formed on the side surface 15 of the tool body 10. It is adapted to engage an opening 23 in the replaceable blade member. Thus there are two separate fastening means including the screw 30 and center locating pin 18 for replaceably securing the rearward end portion of the blade member 20 at two different points along its length to the side surface 15 of the elongated metal tool body 10. The pin 18 and the associated opening 23 in the blade member are preferably made of much smaller diameter than screw 30 and the hole 22.

I prefer to make the tool body 10 by metal injection molding (MIMs), or even better by a sintered metal process. In either case it is not necessary to heat treat the part afterwards.

I prefer to make the replaceable blade member 20 from tool grade steel according to Japanese Industrial Standard (JIS) or ASTM Standards with a high Rockwell hardness such as Rc 57 to 60, or its equivalent.

Alternate Form; and Method of Operation

Figures 2, 3:
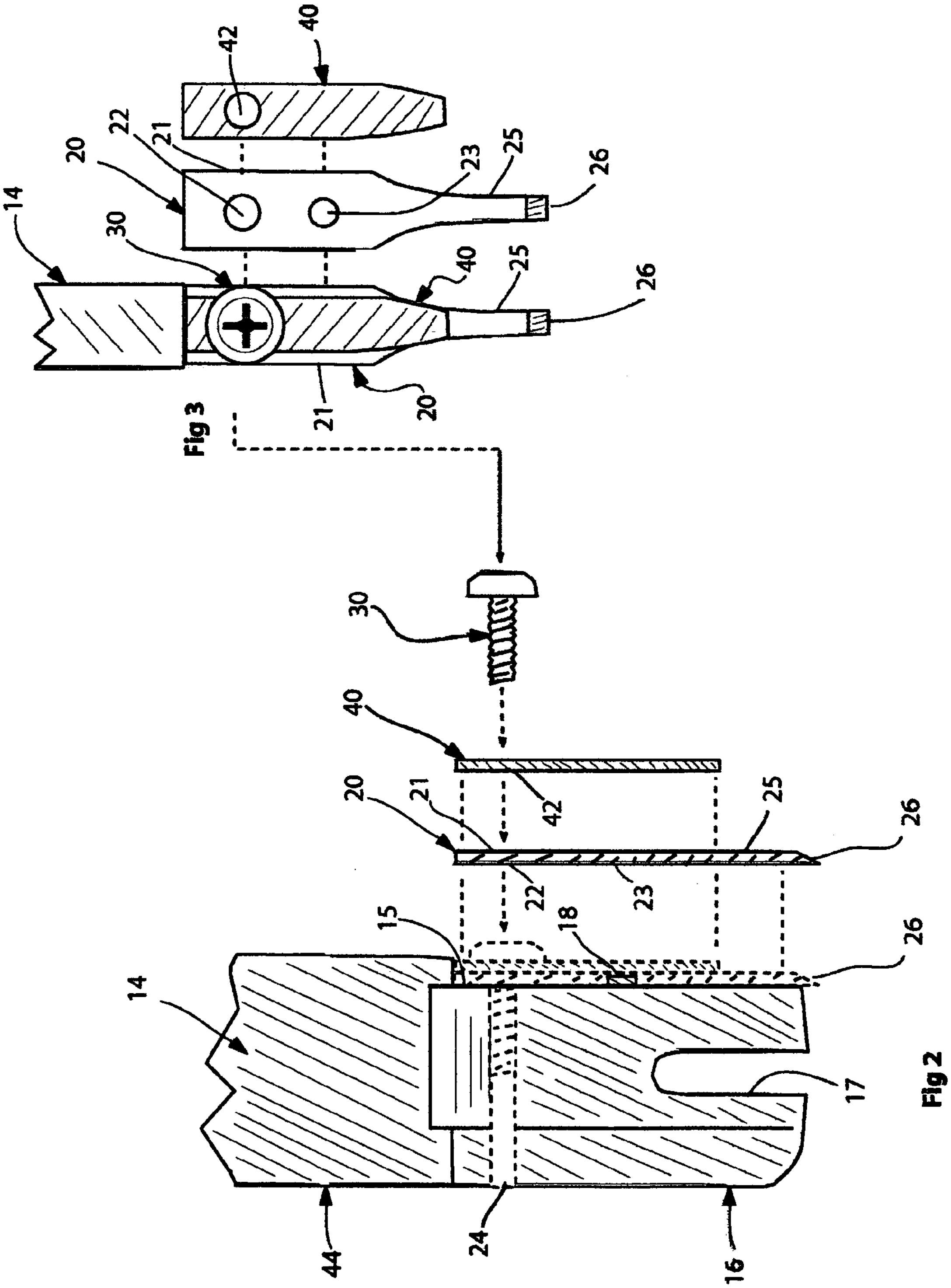
FIG. 2 is a front elevation view of an alternate form of my invention in which a stiffener member is used in conjunction with the blade, and also showing the parts in their disassembled relationship.
FIG. 3 is a side view of the tool assembly of FIG. 2, again illustrating the assembly of the parts.
Figure 4:
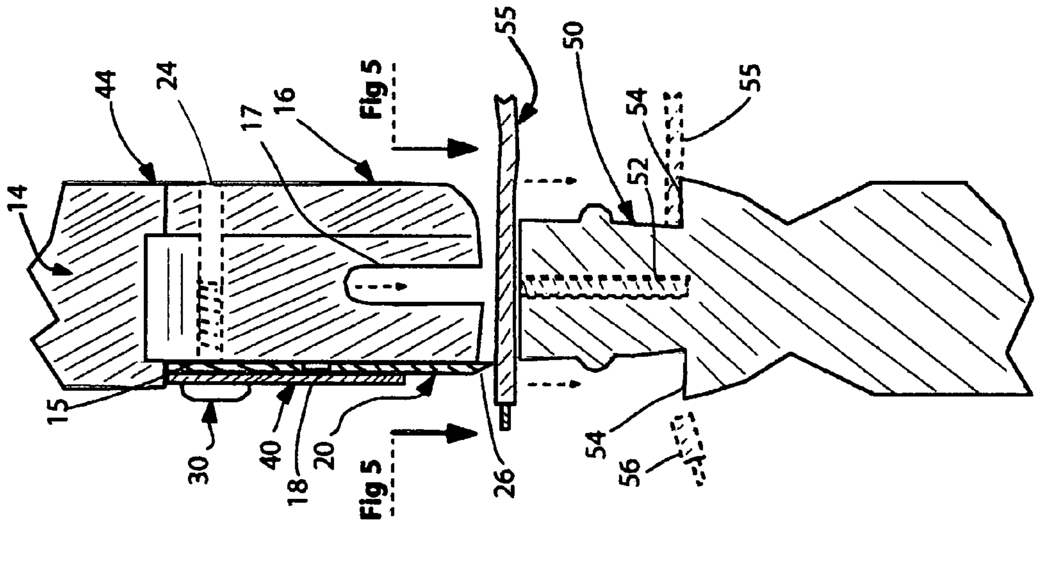
FIG. 4 is a vertical cross-sectional view showing the tool of FIGS. 2 and 3 in action, when about to insert the end of an insulated wire into a connector block.

FIGS. 2 through 4

In an alternate form of my invention as shown in FIGS. 2 through 4 I use a separate stiffener member 40 to provide lateral support and resistance against bending for the replaceable blade member 20. FIG. 2 is a side elevation view and FIG. 3 is a front elevation view, both indicating the disassembled state of the parts. The complete tool assembly is then assembled together in the manner indicated by dotted lines in FIG. 2. As also shown in dotted lines in FIG. 2, the blade member 20 may optionally be partially cut away to provide a recess for receiving the riser or locator pin 18.

Figure 5:
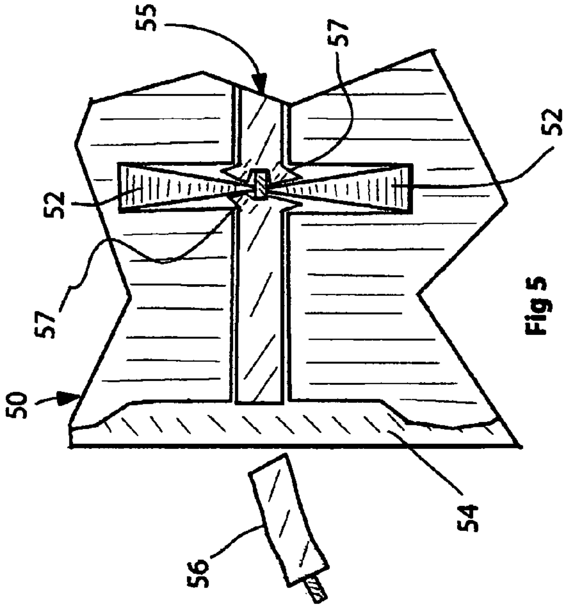
FIG. 5 is a horizontal cross-sectional view taken on the line 5—5 of FIG. 4, showing connector block and insulated wire after the wire end has been seated in the connector.

FIG. 4 shows the tool assembly of FIGS. 2 and 3 as it is about to be used for installing the end of an insulated wire 55 into a connector block 50. FIG. 5 shows a cross-section of the connector after the wire is inserted. Blades 52 of the connector have severed the insulation material 57 on the wire which then remains in almost its original location, except that conductive engagement with the blades has now been achieved. The blade 20 cuts off the wire end 56 against anvil 54 of the connector block. A cut-off end portion of the wire is shown at 56.

Other Alternate Embodiments

Figure 6:
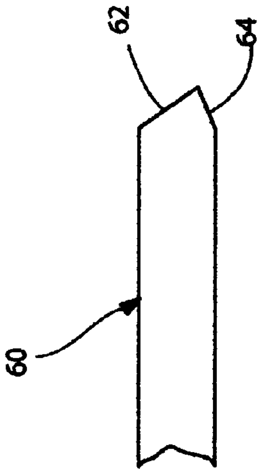
FIG. 6 is a fragmentary plan view showing the end of a modified form of cutting blade having a double sharpened cutting end.

FIGS. 2, 4, and 6

FIG. 6 shows a modified form 60 of the replaceable blade in which the cutting edge is differently formed. Thus I may prefer to grind the cutting end of the blade with a double cut, one being major cut 62 and the other being a minor cut 64. This method protects against burrs or other metal parts from being left on the sharpened blade end. In operation, the cutting of the wire 55 will be done by the major cut edge 62 of the blade end.

In lieu of the stiffener member 40 I may prefer to use a special manufacturing process to add the equivalent of a stiffening rib to the top surface of the blade member. Also, in lieu of the fastening screw as shown I may prefer to have a retainer plate or sheet that rests above the blade member, and provide a pair of latching tabs on the edges of side surface 15 of the tool member to secure the retainer plate in its position.

FIG. 2 also shows a modified form of the tool body in which the rearward part 44 is not shaped as a positioning end. This may be advantageous in using a pressure-generating driver that is different from the conventional impact driver. Preliminary testing of my invention indicates that because of its improved cutting ability at lower force levels, it may be feasible to utilize a different type of driver which generates a selected level of force, but not necessarily a sudden impact as has conventionally been required.

The preferred form of my invention as presently illustrated is primarily intended for use in tool systems of the impact type; that is, including a hand piece to generate an impact that is imparted to the tool body.

Other modifications of my invention will be apparent to those skilled in the art. The presently preferred embodiment of my invention has described in detail in order to comply with the requirements of the patent laws, but the scope of the invention is to be judged only in accordance with the appended claims.

I claim:

1. A termination tool responsive to an impact for inserting the end of an insulated wire into an insulation displacing type electrical connector, securing the wire to the connector, and then cutting off the protruding end portion of the wire, comprising:

a cast tool body having a rearward end part for receiving an impact, a positioning and cutting end with a U-shaped opening that can partially encircle the end of a wire, and a flat side surface on the positioning and cutting end aligned perpendicular to the U-shaped opening;

a replaceable steel blade member having an essentially flat configuration with a wide rearward end portion and a narrower forward end portion, being supported upon the flat side surface of the tool body, and having a forward end with a cutting edge that is also aligned perpendicular to the U-shaped opening and extends beyond the U-shaped opening;

a screw hole formed in the side surface of the tool body at one point along its length, the blade member having an associated opening, and a screw passing through that opening to secure the blade member to the tool body; and a locator pin formed at another point along the length of the side surface of the tool body, the blade member having another opening to receive the locator pin.

2. A termination tool as in claim 1 made by a process of forming the blade member from a material having characteristics significantly different than the elongated metal body, so that heat treating of the elongated metal body is not required and the cutting edge of the blade member can be made sharper than would have been possible if the blade were formed integral with the elongated metal body.

3. A termination tool as in claim 2 wherein the blade member is made according to Japanese Industrial Standard (JIS) with an Rc of 57 to 60.

* * * * *